United States Patent [19]

Kobayashi et al.

[11] Patent Number: 4,839,891
[45] Date of Patent: Jun. 13, 1989

[54] METHOD FOR CONTROLLING DATA FLOW

[75] Inventors: Kazutomo Kobayashi; Hideyuki Fukuoka, both of Tokyo, Japan

[73] Assignee: NEC Corporation, Tokyo, Japan

[21] Appl. No.: 222,930

[22] Filed: Jul. 22, 1988

[30] Foreign Application Priority Data

| Jul. 24, 1987 | [JP] | Japan | 62-185803 |
| Aug. 31, 1987 | [JP] | Japan | 62-218810 |
| Sep. 30, 1987 | [JP] | Japan | 62-248351 |

[51] Int. Cl.$^4$ .............................. H04J 3/26
[52] U.S. Cl. ................................. 370/94; 370/60
[58] Field of Search ............ 370/94, 60, 85, 89; 340/825.5, 825.51; 371/33

[56] References Cited

U.S. PATENT DOCUMENTS

| 4,475,192 | 10/1984 | Fernow et al. | 370/94 |
| 4,677,616 | 6/1987 | Franklin | 370/94 |
| 4,727,537 | 2/1988 | Nichols | 370/94 |
| 4,740,958 | 4/1988 | Duxbury et al. | 370/94 |

Primary Examiner—Douglas W. Olms
Attorney, Agent, or Firm—Foley & Lardner, Schwartz, Jeffery, Schwaab, Mack, Blumenthal & Evans

[57] ABSTRACT

A data packet transmitted from a source data terminal is received by a destination data terminal and stored into a receive buffer from which it is withdrawn at a rate which may differ from the rate of transmission of packets from the source terminal. The destination terminal returns an acknowledgment packet in response to each data packet being withdrawn from the receive buffer. The acknowledging packet includes a flow control variable which is incremented by a unit value in response to the data packet being withdrawn from the receive buffer. The source terminal transmits one or more data packets having sequence numbers the largest of which is determined by a maximum number of outstanding data packets awaiting receipt of the acknowledging packet by the source data terminal and the flow control variable contained in the acknowledging packet.

18 Claims, 7 Drawing Sheets

METHOD FOR CONTROLLING DATA FLOW

BACKGROUND OF THE INVENTION

The present invention relates generally to data transmission systems and, in particular, to a method controlling data flow between data terminal equipments.

In any form of digital system the loss or corruption of a single bit of information can of course be critical. It is thus essential when designing a communications facility for a distributed system to ensure that adequate precautions are taken to detect and, if necessary, correct for any possible loss or corruption of information. Data communication is thus concerned with a protocol with which the transfer rate of data is controlled. Another inportant component of data communication is flow control which is concerned with controlling the rate of transmission of elements, or packets, on a link between terminals of different operating speeds so that the receiver always has sufficient buffer storage resources to accept each element sent to it prior to precessing. Window mechanism is currently in use to permit the source side of a link to send a number of packets before receiving an acknowledgement, or "receive ready (RR)" packet signaling correct receipt of each of the transmitted packets. Because of the high throughput capability of the mechanism, it is used in long distance communications, particularly satellite communications. If a packet is not received correctly received either due to corruption of bits or a complete loss of a packet, a "reject" (REJ) is returned to the transmitter to request retransmission of data. If the receive buffer is overflowed, a "receive not ready (RNR)" packet is returned to the transmitter to halt the transmission of data packets. However, one disadvantage of the current window mechanism is that due to the propagation delay between transmitting a packet and receiving the associated acknowledgment the transmitter receives an acknowledgment after transmitting a number of packets following the corruption of a packet. The receiver discards such following packets and requests the transmitter to retransmit copies of the packets including the corrupted packet. Thus, an error event significantly lowers the throughout of the link. If a satellite link is used, the number of data packets to be discarded in the event of an error is substantial.

SUMMARY OF THE INVENTION

It is therefore an object of the present invention to prevent outsatnding data packets from being discarded in the event of error in a preceding data packet.

According to the present invention, a data packet having a sequence number identifying the packet is transmitted from a source data terminal to a destination data terminal. The received packet is stored into a receive buffer from which it is withdrawn at a rate which may differ from the rate of transmission of packets from the source terminal. The destination data terminal returns an acknowledgment packet in response to each data packet being withdrawn from the receive buffer for signaling correct receipt of the data packet. The acknowledging packet includes a flow control variable which is incremented by a unit value in response to the data packet being withdrawn from the receive buffer. The source data terminal transmits one or more data packets sequence numbers the largest of which is determined by a maximum number of outstanding data packets awaiting receipt of the acknowledging packet by the source data terminal and the flow control variable contained in the acknowledging packet. Thus, the receive buffer is initially filled with a maximum number of outstanding packets in the initial phase of data communication. Since the acknowledging packet is returned each time a packet is withdrawn from the receive buffer, it is highly unlikely that the receive buffer is overflowed during a period following the initial phase of data communication.

To accommodate speed variabilities at both ends of a transmission link, it is preferred that the storage level of the receive buffer is detected by the destination data terminal and compared with a threshold value smaller than the maximum number of outstanding packets. The flow control variable is incremented by the unit value when the storage level becomes lower than the threshold. To ensure high throughput of the transmission link, the detected storage level is preferably compared with an upper threshold value smaller than the maximum number of outstanding packets and a lower threshold value. The flow control variable is incremented by the unit value when the storage level is between the lower and upper threshold values and incremented by more than the unit value when the storage level is equal to the lower thereshold value if the more-than-one increment does not exceed a count incremented in response to receipt of each data packet from the source terminal.

According to a specific aspect of the invention, there is provided a method for controlling the flow of data exchanged between source and destination data terminals. The method comprises transmiting a data packet having a sequence number identifying the packet to said destination data terminal through a transmission medium, receiving the data packet through the transmission medium and storing the packet into a receive buffer from which the stored packets are withdrawn at a rate which may differ from the rate of transmission of the data packets from the source data terminal. A first count representing a sequence number is incremented in response to receipt of each of the data packets and a second count is incremented in response to each data packet being withdrawn from the receive buffer. The first and second courts are transmitted to the source data terminal in a packet signaling correct receipt of the data packet. In response to these counts the source terminal transmits one or more data packets having sequence numbers the least of which immediately follows the sequence number represented by the first count and the largest of which is determined by a maximum number of outstanding data packets awaiting receipt of the acknowledging packet by the source data terminal and the second count.

BRIEF DESCRIPTION OF THE DRAWINGS

The present invention will be described in further detail with reference to the accompanying drawings, in which.

DETAILED DESCRIPTION

Figure 1:
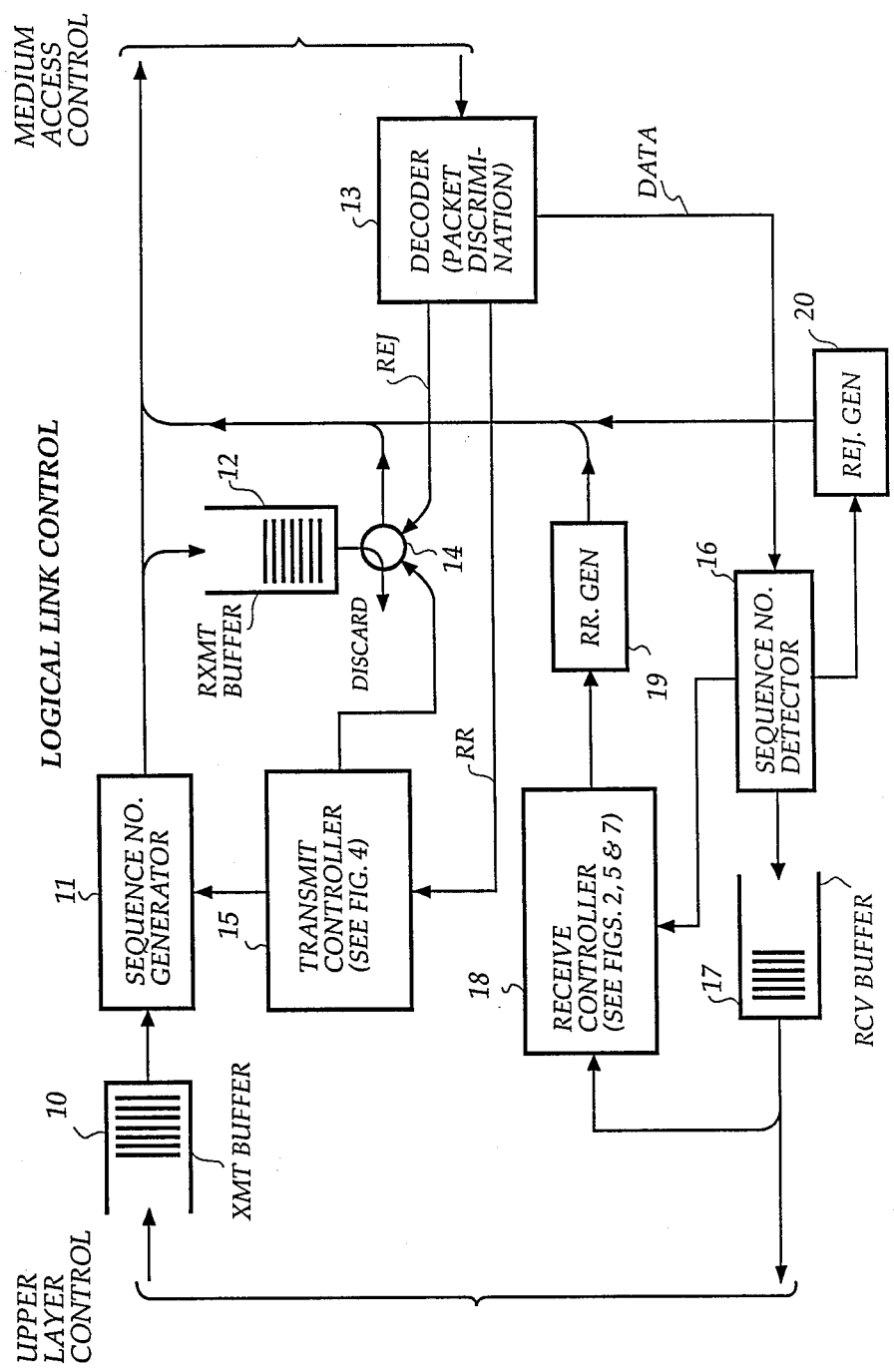
FIG. 1 is a block diagram of a logical link control sublayer of a local area network embodying the present invention.

Referring now to FIG. 1, there is shown a logical link control (LLC) sublayer of a data terminal of the present invention for a local area network. According to the IEEE standards 802 Local Area Network Protocol, the LLC sublayer constitutes the top sublayer in the Data Link Layer to provide functions involving checking receive sequence numbers signaling correct receipt of a packet, buffer control management, retransmission of packets when requested and generation of sequence numbers for packets to be transmitted. The LLC sublayer is associated with a medium access control (MAC) sublayer which contitutes the underlying sublayer of the data link layer. Through a physical layer, the MAC sublayer is associated with a transmission medium via which the data terminal is connected to a distant data terminal. The LLC sublayer is associated with an upper layer control which provides end-to-end protocols.

As shown in FIG. 1, the LLC sublayer comprises a transmit buffer 10 which accepts packets supplied from the upper layer control. A sequence number generator 11 is connected to the transmit buffer 10 to append a send sequence number to each packet to be transmitted. Sequence number generator 11 is connected to the output of a transmit controller 15. Transmit controller 15 determines a window size, or the number of packets that can be outstanding, in response to a signal from a decoder 13 and allows the sequence number generator 11 to send packets according to the window size by withdrawing packets from the transmit buffer 10 and direct a gate 14 to discard a packet from retransmit buffer 12 when a "receive ready" (RR) packet is detected by the decoder 13. Gate 14 is further controlled by the decoder 13 to retransmit packets from the buffer 12 in the event that a "reject" (REJ) packet is received from the distant terminal indicating that a transmitted packet is corrupted or completely lost. As will be described in detail, the transmit controller 15 sets window size to $(k+j-1)$ in response to an RR(i,j) acknowledgment packet received from the distant terminal and directs the gate 14 to discard a data packet $D(i-1)$, where K is the maximum number of outstanding packets and, i is a send sequence number and j is a flow control variable.

Decoder 13 provides packet discrimination functions by coupling packets RR and REJ from the distant terminal to the transmit controller 15 and gate 14, respectively, and coupling data packets to a sequence number detector 16. Sequence number detector 16 checks each of the receive sequence numbers for correct sequence and supplies the received packet to a receive buffer 17 if the sequence number of that packet is correct and supplies the correct receive sequence number to a receive controller 18. Otherwise, the sequence number detector 16 discards out-of-sequence packets and instructs an REJ generator 20 to return a "reject" packet to the distant terminal. The data packets stored in the receive buffer 17 are withdrawn by the upper layer control at a rate which may differ from the transmission rate of received data.

As will be described in detail hereinbelow, the receive controller 18 increments a first count value i in response to the receipt of a correct sequence number from the sequence number detector 16, increments a second count value j in accordance with an algorithm of the present invention and directs an RR generator 20 to return an RR(i,j) packet acknowledging correct receipt of a packet.

Figure 2:
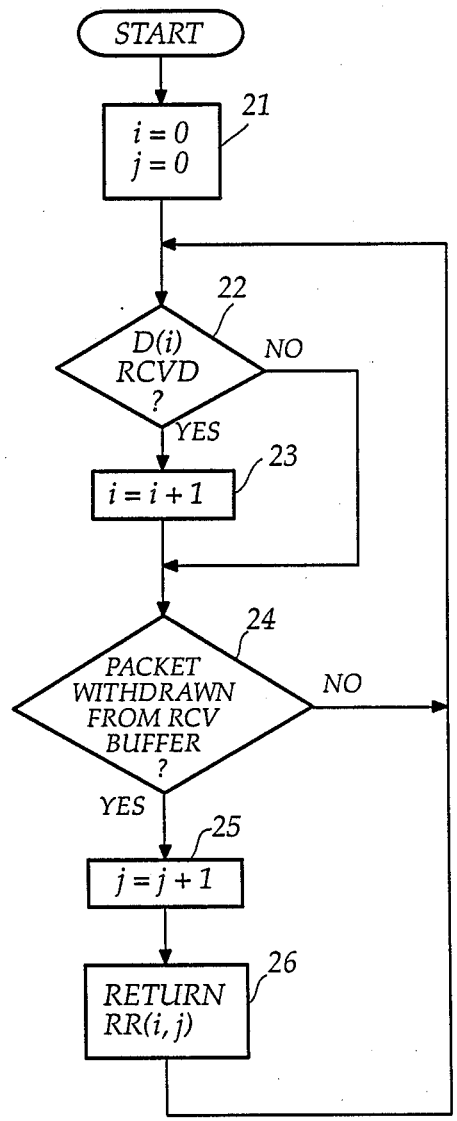
FIG. 2 is a flow diagram describing programmed instructions performed by the receive controller of FIG. 1 according to a first embodiment of the present invention.

The control algorithm of the receive controller 18 according to a first embodiment of the invention is illustrated in FIG. 2. Receive controller 18 essentially comprises a microprocessor which is programmed to execute steps in sequence starting with initializing block 21 which directs the resetting of the first and second count values i and j to zero. Exit then is to decision block 22 which checks for the arrival data packet D(i) from a correspondent data terminal. If there is one, control proceeds to operations block 23 which directs the incrementing of the count value i by one and proceeds to decision block 24 which checks for the withdrawal of a packet from the receive buffer 17. If a data packet is not withdrawn from buffer 17 immediately following the incrementing of the count i, decision blocks 22 and 24 will be looped until the next packet is received from the transmitter or a previous packet is withdrawn from the receive buffer 17. If the answer is negative in decision block 22, control exits to block 24. If no packet is withdrawn from buffer 17, control returns to block 22, so that the first count i is incremented successively in response to an arrival of a packet. Whenever a packet is withdrawn from the buffer 17, operations block 25 is executed by incrementing the second count j by one. Exit then is to operations block 26 which directs the RR generator 19 to return an RR(i,j) packet signaling the correct receipt of packets of which the most recent one has a sequence number $D(i-1)$.

Figure 3:
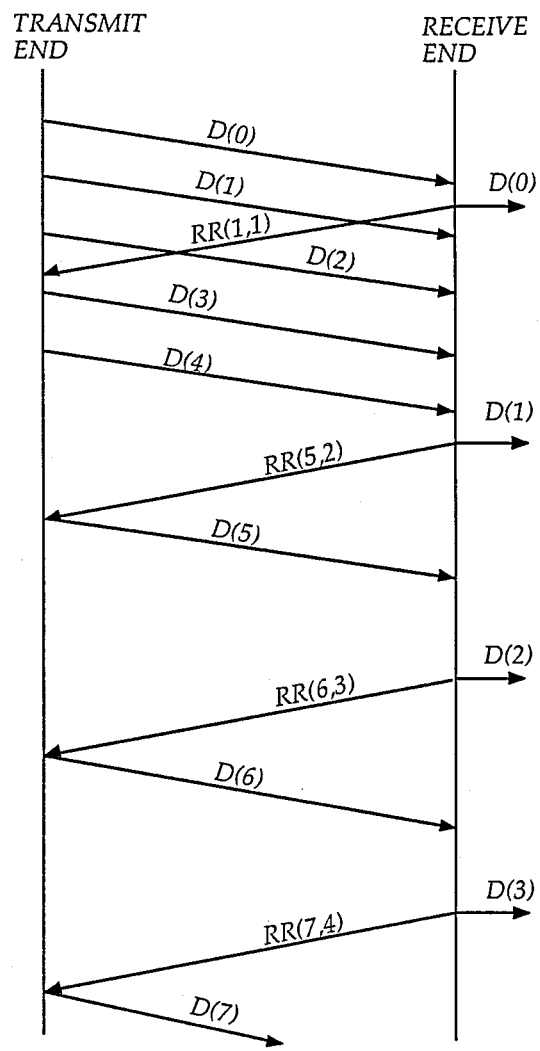
FIG. 3 is a flow diagram illustrating the flow of data between source and destination data terminals according to the first embodiment of the present invention.
Figure 4:
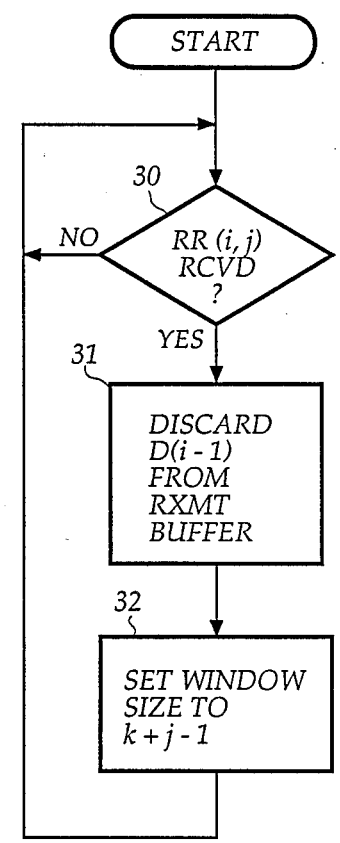
FIG. 4 is a flow diagram describing programmed instructions performed by the transmit controller of FIG. 1 according to the present invention.

The operation of the flow diagram of FIG. 2 will be better understood with reference to FIGS. 3 and 4. Assume that the maximum number k of outstanding packets is 4 and the rate of packet withdrawal from the receive buffer 17 is ¼ of the transmission rate of the transmitter. In response to the receipt of a first data packet D(0), the receiver increments the count i to 1. Decision blocks 22 and 24 are looped until the packet D(0) is withdrawn from the buffer 17, whereupon the count j is incremented to 1 and the RR generator 19 is caused to return a "receive ready" packet RR(1,1) to the transmitter. On execcution of block 26, control returns to block 22 to repeat process.

When the transmitter receives the acknowledging packet RR(1,1), the transmit controller 15 of the transmitter begins executing a program as shown in FIG. 4. The program starts with decision block 30 which checks for the presence of an RR(i,j) packet. with the integer i indicating that the data packets bearing sequence numbers up to $i-1$ have been correctly received. Exit then is to operations block 31 which intructs the gate 14 to discard the data packet $D(i-1)$ from the retransmit buffer 12 and control exits to operations block 32 which directs the setting of a "window size" to (k+j−1). In this way, a copy of the original data packet D(0) stored in the retransmit buffer 12 of the transmitter is discarded and a window size 4(=4+1−1) is determined. This window size indicates that the transmitter is allowed to send data packets up to D(4) in sequence. Thus, the sequence number generator 11 of the transmitter is allowed to withdraw four successive data packets from the transmit buffer 10 following the transmission of the packet D(0) and appends send sequence number 1 through 4 to sent packets D(1) through D(4).

On receiving the second to fifth packets D(1) to D(4), the receiver successively increments the count i to 5 by executing blocks 23. Since no packet is withdrawn from buffer 17 until packet D(4) is received, the count j is not incremented to 2 before oacket D(1) is withdrawn. Acknowledging packet RR(5,2) is now returned to the transmitter signaling the correct receipt of packets having sequence numbers up to D(4). On receiving the packet RR(5,2), the transmitter discards copies of the original packets D(1) through D(4) from the retransmit buffer 12 and the window size to 5 which allows the sequence generator 11 to send a packet D(5).

Since the transmitter is allowed to send packets as many as requested by the RR packet and each RR packet is returned whenever each data packet is withdrawn from the receive buffer 17, it is unlikely that the receive buffer 17 is overflowed and thus there is a small likelihood of a situation requiring the transmission of a "receive not ready" (RNR) packet to the transmitter to discard packets following the occurrence of an error.

However, buffer overflow can occur due to variabilities in operating speeds at both transmit and receive ends of the link. It is thus desirable to accommodate speed variabilities.

Figure 5:
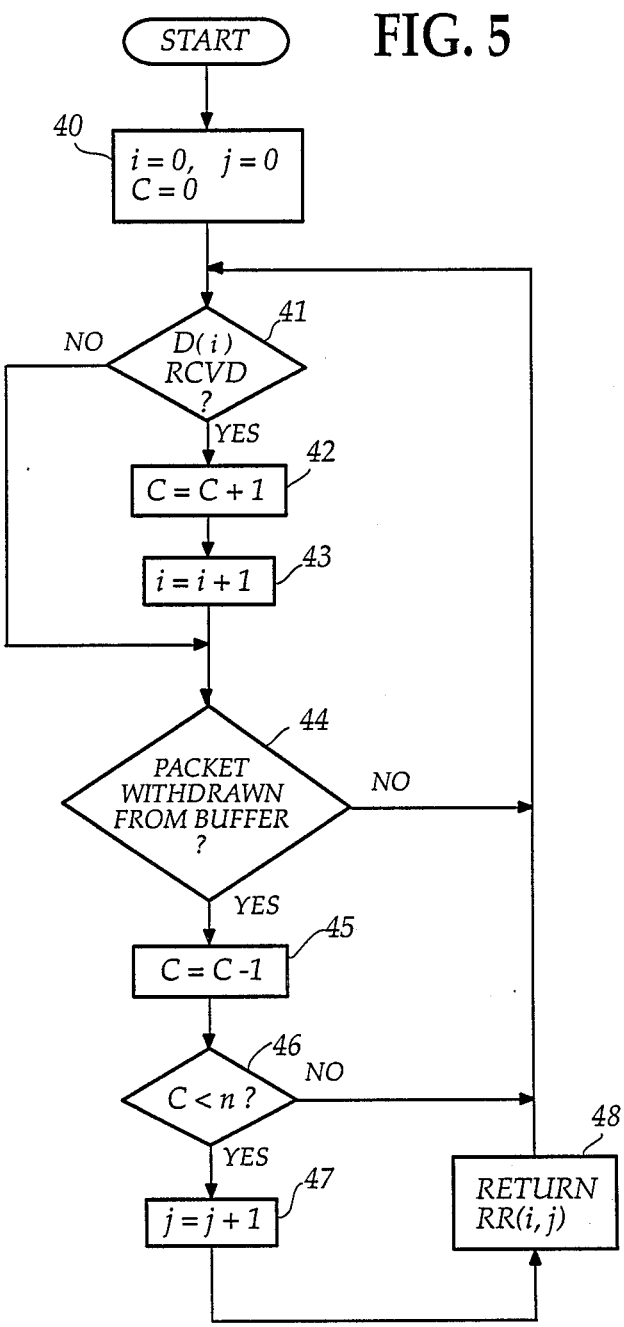
FIG. 5 is a flow diagram describing programmed instructions performed by the receive controller of FIG. 1 according to a second embodiment of the present invention.

FIG. 5 is a flow diagram of the control algorithm of the receive controller 18 according to a second embodiment of the present invention which allows the receive buffer 17 to accommodate speed variabilities. In this embodiment, the program starts with initializing block 40 which directs the resetting of the first and second count values i and j and a third count value C which indicates the storage level of the receive buffer 17. Exit then is to decision block 41 which checks for the arrival of a data packet D(i). If there is none, control proceeds to decision block 44 to check for the withdrawal of a packet from receive buffer 17, and if there is one, exit is to operations block 42 which directs the incrementing of the count C by one and quits to operations block 43 which directs the incrementing of the count i by one proceeds to block 44. If no packet is withdrawn from buffer 17, control returns to block 41 to increment the counts C and i in response to the receipt of each packet.

When a packet is withdrawn from buffer 17, control proceeds to operations block 45 to decrement the count C by one and proceeds to decision block 46 to check to see if the count C is smaller than a predetermined threshold n which is smaller than k. If C is equal to or greater than n, control returns to block 41 to repeat the above process, so that the count C is decremented in response to the withdrawal of each data packet from buffer 17. When C becomes smaller than n, control procceds to operations block 47 to increment the count j by one. Exit then is to operations block 48 which directs the RR generator 19 to send an RR(i,j) packet to the transmitter and control returns to block 41.

In this way, count j is incremented and a "receive ready " packet is returned to the transmitter whenever a data packet is received provided that the count C is smaller than n.

Figure 6:
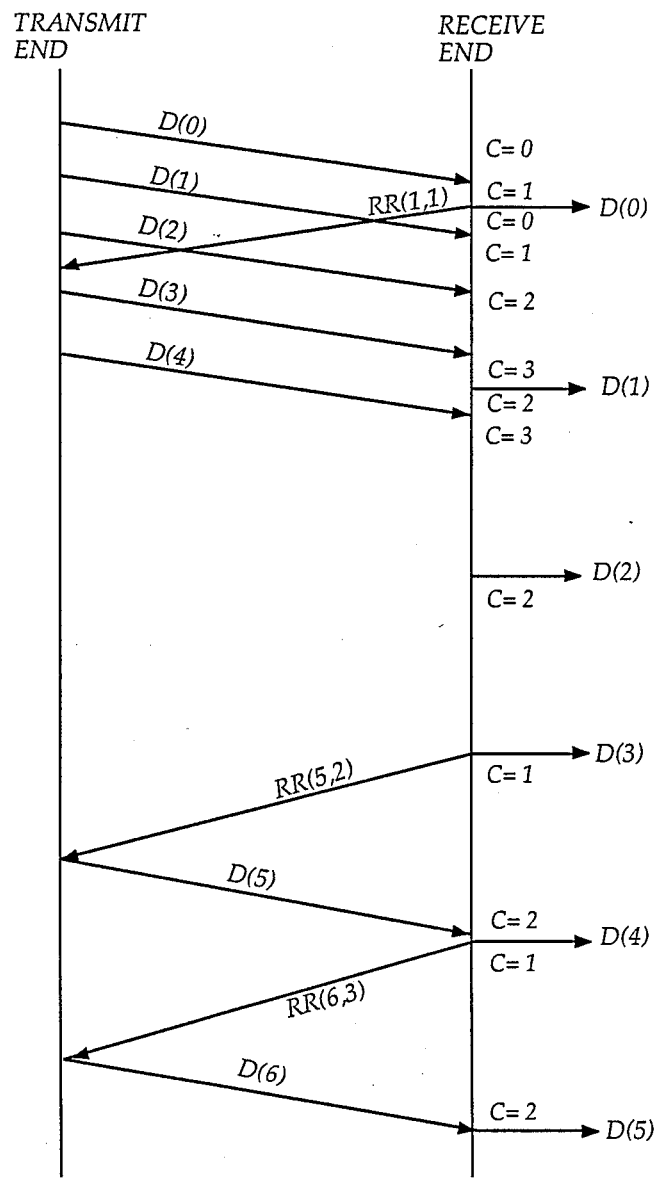
FIG. 6 is a flow diagram illustrating the flow of data between source and destination data terminals according to the second embodiment of the present invention.

The operation of the flow diagram of FIG. 5 will best be understood with reference to FIG. 6. The integer n is assumed to be "2", while k is assumed to be "4" as in the previous embodiment. In response to receipt of a first data packet D(0) from the transmitter, counts C and i are incremented to 1 in blocks 42 and 43 and decision blocks 44 and 41 are looped until the packet D(0) is retrieved from the receive buffer 17, whereupon C is decremented (block 45). Since the count C is smaller than threshold n (block 46), the count j is incremented to 1 (block 47) and a packet RR(1,1) is returned (block 48). Control then returns to block 41 to repeat the process.

On receiving the packet RR(1,1) the transmitter sets the window size to (k+j−1), namely "4" as in the previous embodiment to sequentially send packets up to D(4), In response to the second to fifth packets D(1) to D(4), the count i is successively incremented to "5", while the count C is incremented to "3" since the received packet D(1) is retrieved following the receipt of the packet D(3). With the count C being greater than the threshold n, blocks 41 to 46 are looped until the affirmative condition of block 46 prevails. Thus, count C is successively decremented to "1" in response to the removal of packets D(2) and D(3) from buffer 17 so that the affirmative condition of block 46 prevails immediately following the removal of packet D(3). Thus, count j is incremented to "2" (block 47) and an RR(5,2) packet is returned to the transmitter (block 48). With the arrival of the next packet D(5), counts i and C are incremented to "6" and "2", respectively. However, the removal of packet D(4) immediately following the receipt of packet D(5) causes count C to be decremented to "1", causing the affirmative condition of block 46 to prevail again to increment the j to "3" (block 47) to return an RR(6,3) packet to the transmitter (block 48).

Since the acknowledgment packet RR(i,j) is not returned as long as the storage level of the receive buffer 17 is lower than threshold n, the receive buffer 17 is left with a margin sufficient to accommodate speed variations.

If the operating speed of the receiver has increased to a level approaching the speed of the transmitter, the throughput of the link increases to a maximum. However, the increase in transmission speed can eventually result in a situation in which the receive buffer 17 is completely emptied and hence the receiver must wait for the next packet for the interval of the propagation delay. This results in a reduction of throughput.

Figure 7:
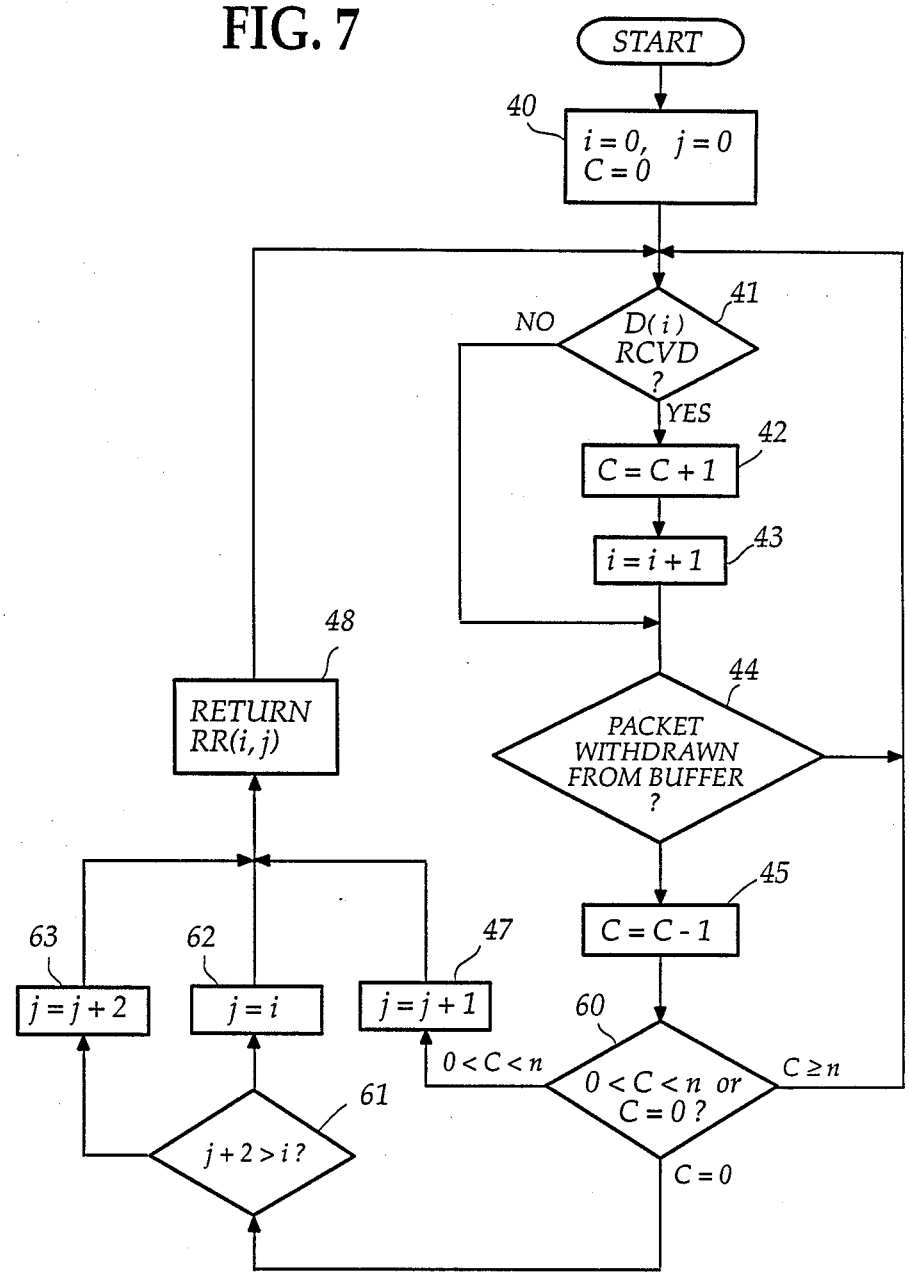
FIG. 7 is a flow diagram describing programmed instructions performed by the receive controller of FIG. 1 according to a third embodiment of the present invention.

FIG. 7 is a third embodiment of the present invention which is an improvement to the second embodiment. In FIG. 7, blocks corresponding to those in FIG. 5 are marked with the same reference numerals as those in FIG. 5. The third embodiment differs from the second embodiment by the provision of blocks 60 to 63 instead of decision block 46 of FIG. 5

Following the execution of operations block 45, control proceeds to decision block 60 which checks to see if the count value C is between 0 and n or equal to 0. If 0 < C < n, exit is to operations block 41 to increment count J by one and if C = 0, exit is to decision block 61 which checks to see if (J+2) is greater than i. If the answer is affirmative, exit is to operations block 62 which directs the setting of the count j equal to i, and if (j+2) is equal to or smaller than i, exit is to operations block 63 which directs the incrementing of the count J by two. If C is equal to or greater than n, the exit from block 60 is to block 41 to repeat the process. Following the execution of block 47 or 63, operations block 48 is executed to return an RR(i,j) packet.

Figure 8:
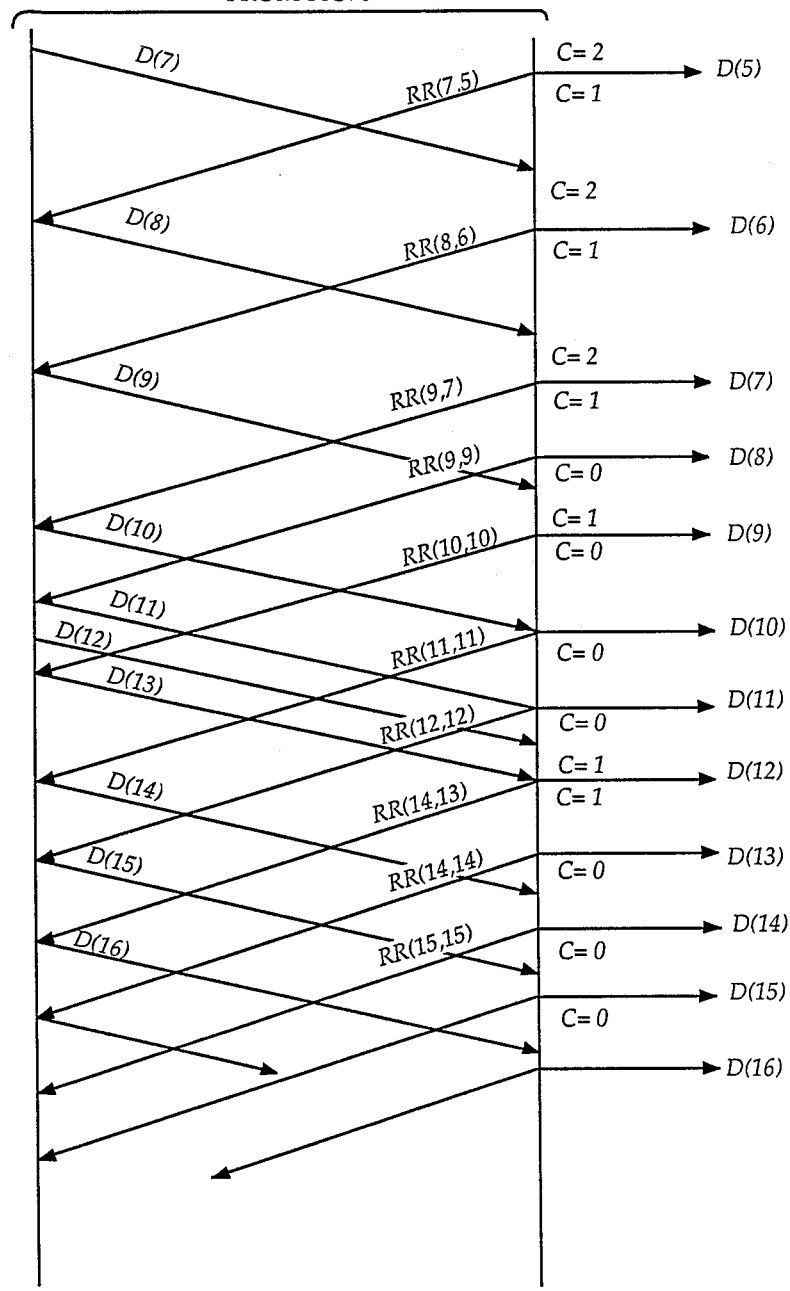
FIG. 8 is a flow diagram illustrating the flow of data between source and destination data terminals according to the third embodiment of the present invention.

The operation of the flow diagram of FIG. 7 will proceed in a manner similar to that shown in FIG. 6 until the count C approaches 0. FIG. 8 illustrates a sequence of events which occur following the reception of packet D(6). It is seen that as long as $0<C<n$ (i.e., $C=1$), the count j is incremented by one as in the second embodiment so that the transmitter is allowed to send only one packet when each of packets D(5), D(6), D(7) and D(12) is withdrawn from buffer 17. When C becomes equal to 0, the count j is incremented by "2" provided that (j+2) is not greater than i or set equal to i provided that (j+2) is smaller than i. This allows the transmitter to sent more than one packet ony when the count j does not exceeds the count i. In FIG. 8, the situation that satisfies the negative conditio of decision block 61 is seen to occur when packet D(8) is withdrawn from receive buffer 17 and an RR(9,9) packet is returned, allowing the transmitter to send packets D(11) and D(12) in succession while acknowledging correct receipt of packet D(8). On the other hand, the affirmative condition of decision block 61 prevails when each of the packets D(9), D(10) to D(16) is withdrawn from the receive buffer.

Therefore, when the storage level of the receive buffer 17 reaches the lower limit of "0", the transmitter is allowed to increase packets to be sent when the count j, incremented by more than the unit value, does not exceed the count i and is requested to decrease packets to be sent when the count j, if otherwise incremented by more than the unit value, exceeds the count i. In addition, if the storage level is between the lower and upper limits, the transmitter is allowed to send one packet. When the storage level reaches upper limit, the transmitter is not allowed to send packets. In this way, the throughput of the link can be increased to a maximum, while keeping the receive buffer at an appropriate storage level for accommodating speed variations.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A data communication system for exchanging information between a source data terminal and a destination data terminal having a receive buffer for storing data packets, comprising:

means for transmitting a data packet from said source data terminal, said data packet having a sequence number identifying the packet; and means for receiving said data packet by said destination data terminal and storing the received packet into said receive buffer and returning an acknowledgment packet to said source data terminal in response to each data packet being withdrawn from said receive buffer, said acknowledging packet signaling correct receipt of said data packet and including a flow control variable incremented by a unit value in response to said data packet being withdrawn from said receive buffer, said source data terminal transmitting one or more data packets having sequence numbers the largest of which is determined by a maximum number of outstanding data packets awaiting receipt of said acknowledging packet by said data terminal and said flow control variable contained in said acknowledging packet.

2. A data communication system as claimed in claim 1, wherein said destination data terminal includes means for detecting the storage level of said buffer, comparing the detected storage level with a threshold value smaller than said maximum number of outstanding packets and incrementing said flow control variable by said unit value when said storage level becomes lower than said threshold value.

3. A data communication system as claimed claim 1, wherein said destination data terminal includes means for detecting the storage level of said buffer, comparing the detected storage level with an upper threshold value smaller than said maximum number of outstanding packets and a lower threshold value, incrementing said flow control variable by said until value when said storage level is between said lower and upper threshold values and incrementing said flow control variable by more than said unit value when said storage level is equal said lower threshold value.

4. A data communication system as claimed in claim 1, wherein said destination data terminal increments a count in response to receipt of a data packet from said source data terminal and increments said flow control variable by more than said unit value when said storage level is equal to said lower threshold value provided that said incremented flow control variable does not excced said count.

5. A data communication system as claimed in claim 1, wherein said destination data terminal increments a count in response to receipt of a data packet from said source data terminal and increments said flow control variable by an amount so that it equals said count when said storage level is equal to said lower threshold value provide that said flow contol variable would exceed said count if said flow control variable is otherwise incremented by more than said unit value.

6. A data communication system as claimed in claim 3,4 or 5, wherein said lower threshold value corresponds to a storage level of said receive buffer having no data packets therein.

7. A logical link control sublayer of a local are network, said logical link control layer being associated with an upper layer for end-to-end communications and associated with a medium access control layer, comprising transmit control means for transmitting a data packet having a sequence number identifying the packet to a destination data terminal through said medium access control layer;

a receive buffer for receiving said data packet through said medium access control layer, said data packets being withdrawn from said buffer to said upper layer; and receive control means for returning an acknowledgment packet to a source data terminal through said medium access control layer in response to each data packet being withdrawn from said receive buffer for signaling correct receipt of said data packet, said acknowledging packet including flow control variable incremented by a unit value in response to said data packet being withdrawn from said receive buffer, said transmit control means transmitting to said destination data terminal one or more data packets having sequence numbers the largest of which is determined by a maximum number of outstanding data packets awaiting receipt of said acknowledging packet by said source data terminal and said flow control variable contained in said acknowledging packet.

8. A logical link control sublayer a local area network as claimed in claim 7, wherein said receive control means includes means for detecting the storage level of said receive buffer, comparing the detected storage level with a threshold value smaller than said maximum number of outstanding packets and incrementing said flow control variable by said unit value when said storage level becomes lower than said threshold value.

9. A logical link control sublayer of a local area network as claimed in claim 7, wherein said destination data terminal includes means for detecting the storage level of said buffer, comparing the detected storage level with an upper threshold value smaller than said maximum number of outstanding packets and a lower threshold value, incrementing said flow control variable by said unit value when said storage level is lower between said lower and upper threshold values and incrementing said flow control variable by more than said unit value when said storage level is equal to said lower threshold value.

10. A logical link control sublayer of a local area network as claimed in claim 7, wherein said receive control means increments a count in response to receipt of a data packet from said source data terminal and increments said flow control variable by more than said unit value when said storage level is equal to said lower threshold value provided that said incremented flow control variable does not exceed said count.

11. A logical link control sublayer of a local area network as claimed in claim 7, wherein said receive control means increments a count in response to receipt of a data packet from said source data terminal and increments said flow control variable by an amount so that it equals said count when said storage level is equal to said lower threshold value provided that said flow control variable would exceed said count if said flow control variable is otherwise incremented by more than said unit value.

12. A logical link control sublayer of a local area network as claimed in claim 9, 10, or 11, wherein said lower threshold value corresponds to a storage level of said receive buffer having no data packets therein.

13. A method for controlling the flow of data exchanged between source and destination data terminals, comprising the steps of:
(a) transmitting a data packet having a sequence number identifying the packet to said destination data termianal through a transmission medium;
(b) receiving said data packet through said transmission medium and storing the packet into a receive buffer from which the stored packets are withdrawn at a rate which may differ from the rate of transmission of said data packets from said source data terminal;
(c) incrementing a first count representing a sequence number in response to receipt of each of said data packets;
(d) incrementing a second count in response to each data packet being withdrawn from said receive buffer;
(e) transmitting said first and second counts to said source data terminal for signaling correct receipt of said data packet; and
(f) receiving said first and second counts and transmitting one or more data packet from said source data terminal to said destination data terminal, said one or more data packets having sequence numbers the least of which immediately follws the sequence number represented by the received first count and the largest of which is determined by a maximum number of outstanding data packets awaiting receipt of said acknowledging packet by said source data terminal and said second count.

14. A method for controlling the flow of data as claimed in claim 13, wherein the step (d) comprises:
detecting the storage level of said receive buffer; comparing the detected storage level with a threshold value smaller than said maximum number of outstanding packets; and
incrementing said second count by a unit value when said storage level becomes lower than said threshold value.

15. A method for controlling the flow of data as claimed in claim 13, wherein the step (d) comprises:
($d_1$) detecting the storage level of said buffer;
($d_2$) comparing the detected storage level with an upper threshold value smaller than said maximum number of outstanding packets and a lower threshold value; and
($d_3$) incrementing said second count by a unit value when said storage level is between said lower and upper threshold values and incrementing said second count by more than said unit value when said storage level is equal to said lower threshold value.

16. A method for controlling the flow of data as claimed in claim 15, wherein the step ($d_3$) comprises incrementing said second count by more than said unit value when said storage level is equal to said lower threshold value provided that said incremented second count does not exceed said first count.

17. A method for controlling the flow of data as claimed in claim 15, wherein the step ($d_3$) further comprises incrementing said second count by an amount so that it equals said first count when said storage level is equal to said lower threshold value provided that said second count would exceed said first count if said second count value is otherwise incremented by more than said unit value.

18. A method for controlling the flow of data claimed in claim 15, 16 or 17, wherein said lower threshold value corresponds to a storage level of said receive buffer having no data packets therein.

* * * * *